(12) United States Patent
Xu et al.

(10) Patent No.: US 12,486,498 B2
(45) Date of Patent: *Dec. 2, 2025

(54) L-ARGININE-GLYCINE AMIDINOTRANSFERASE AND USE THEREOF IN THE PRODUCTION OF GUANIDINOACETIC ACID

(71) Applicant: JIANGNAN UNIVERSITY, Wuxi (CN)

(72) Inventors: Meijuan Xu, Wuxi (CN); Zhiming Rao, Wuxi (CN); Yaxin Liao, Wuxi (CN); Haofei Xu, Wuxi (CN); Xian Zhang, Wuxi (CN); Taowei Yang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 31 days.

This patent is subject to a terminal disclaimer.

(21) Appl. No.: 18/415,827

(22) Filed: Jan. 18, 2024

(65) Prior Publication Data

US 2024/0344038 A1 Oct. 17, 2024

Related U.S. Application Data

(63) Continuation of application No. PCT/CN2023/098457, filed on Jun. 6, 2023.

(30) Foreign Application Priority Data

Mar. 20, 2023 (CN) .......................... 202310271233.4

(51) Int. Cl.
  *C12N 9/10* (2006.01)
  *C12N 15/70* (2006.01)
  *C12P 13/04* (2006.01)

(52) U.S. Cl.
  CPC ........... *C12N 9/1003* (2013.01); *C12N 15/70* (2013.01); *C12P 13/04* (2013.01); *C12Y 201/04001* (2013.01)

(58) Field of Classification Search
  CPC .... C12N 9/1003; C12N 15/70; C12N 9/1096; C12P 13/04; C12P 13/10; C12Y 201/04001; Y02A 50/30; C12R 2001/19
  See application file for complete search history.

(56) References Cited

FOREIGN PATENT DOCUMENTS

| CN | 108929886 A | 12/2018 |
|---|---|---|
| CN | 111748506 A | 10/2020 |
| CN | 111748548 A | 10/2020 |
| CN | 113481139 A | 10/2021 |
| EP | 3839051 A1 | 6/2021 |
| WO | 2022243116 A1 | 11/2022 |

OTHER PUBLICATIONS

Martijn et al., GenBank accession No. PPR45715, Feb. 22, 2018.*
Witkowski et al., Biochemistry 38:11643-11650, 1999.*
Tang et al., Phil Trans R Soc B 368:20120318, 1-10, 2013.*
Seffernick et al., J. Bacteriol. 183(8):2405-2410, 2001.*
Singh et al., Current Protein and Peptide Science 19(1):5-15, 2018.*
Sadowski et al., Current Opinion in Structural Biology 19:357-362, 2009.*

* cited by examiner

Primary Examiner — Delia M Ramirez
(74) Attorney, Agent, or Firm — SZDC Law PC

(57) ABSTRACT

The present invention discloses an L-arginine-glycine amidinotransferase and use thereof in the production of guanidinoacetic acid. In the present invention, through combined multi-site amino acid mutation, a technical effect of significantly improved enzyme activity of the mutant AkAGAT$_{T225Q/A258P/L278K}$ than that of the wild-type strain is achieved, providing an application value for large-scale production of guanidinoacetic acid in industry. When the L-arginine-glycine amidinotransferase mutant constructed in the present invention is used in the production of guanidinoacetic acid, by optimizing the conversion conditions, the yield of guanidinoacetic acid is up to 21.4 g/L and the conversion rate is 90.4%, after 24 hrs of reaction in a 1 L reaction system. Compared with the production of guanidinoacetic acid with the raw enzyme, the yield is increased by 49.6%.

1 Claim, 5 Drawing Sheets
Specification includes a Sequence Listing.

SEQUENCE LISTING

```
Sequence total quantity: 14
SEQ ID NO: 1            moltype = DNA  length = 1131
FEATURE                 Location/Qualifiers
source                  1..1131
                        mol_type = other DNA
                        organism = unidentified
SEQUENCE: 1
atgcggactg acaccagaat cgtcaactcc tggaacgagt gggacactct ccaggaggtc    60
gtcgtgggca ccgcggagaa cgcctgcttc gagccgaccg agccgggaca ccggcccccag   120
gagcgcgggc tgcccgagcc acgaccgttc cccaccggcc cgaaacccccg ggaactcaac   180
gaaaaggccg aagaggagct cgccgggctc gtgtccctgc tcgagacgca cggggtcacg   240
gtgcgccggc cgtcgccgcg ggactactcg atcccgctca agacgcccac gttcgaggtg   300
```

-continued

```
gagaaccagt actgcgcggt ctgcccccgg gacgtgatga tcaccctcgg ccacgagatc    360
ctcgaggcga cgatgtcgcg gcggtcgcgg tacttcgagt acgaggccta ccggagcctg    420
gtctacgagt actgggacca ggacccgcag atgacgtggt cggtggcccc gaagccgtcc    480
atggccgacg agatgtaccg ccaggacttc tggacctggc cgctgtcgaa gcggcacgag    540
gagatgcaca acttcgagtt ctgcgtgacg caggacgagg tcgtcttcga cgccgcggac    600
atggcgcgga tgggcaagga catcttcgtc caggagtcga tgaccaccaa ccgcgcgggc    660
atccggtggc tcacccggca cctggagccg aagggtttcc gcgtgcaccc ggtgcacttc    720
ccgctggact acttcccgtc ccacatcgac gcgacgttca tcccgctgcg cgcgggcctg    780
gtgctcacca accccgagcg cccgatcagc agcggcgagg agaagctgtt cctggccatc    840
gactgggagt tcgtgaccgc gccccagccg ctcaccggca acgacgagat gccccgctac    900
tgccagtcgt ccaagtgggt gtcgatcaac gtgctcagca tctcgccgtc gaagatcatc    960
gtcgaggagc aggagaagcc gctgcaggac ctgttgtgca gcctgggctt cgaggtgctg   1020
ccgctgccgt tccggcacgt ctacgagtac ggcggttcgc tgcactgcgc cacgtgggac   1080
gtccgccgcg acggcgggtg cgaagactac ttcccgaacc agaacgtgtg a            1131

SEQ ID NO: 2             moltype = DNA   length = 1182
FEATURE                  Location/Qualifiers
source                   1..1182
                         mol_type = other DNA
                         organism = unidentified
SEQUENCE: 2
atgactaacc ctttccgcac actgaaggca ggcaaccgca tgcagcaagt gtccgaggtc     60
gtcaactcgt ggaacgagtg ggacccgctg gaggagatcg tcgtcgggtc ggccgacggg    120
gccaacttcg agccgaccga gccgggcaac cggccgcaga tccgcaacgc cccgccgggc    180
acgccgttcc cgtccgggcc gaagtccgcc gaggcggtcg accgggccaa cgaggagctg    240
gccgggctgg tgtcccttct ggagtccgag ggagtgcggg tgccgagcgc cgcaccgcac    300
gacttctcgc agtcggtgcg cacgcccgac ttcgaggcgc caaccagta ctgccgcggtg    360
tgcccgcggg acgtggatga tcaccatcgg aacgagatca tcgaggcgcc gatgtcgcgg    420
cggtcgcggt acttcgagtt ccagccgtac cgggagctgg tgtacgagta ctggaacgcc    480
gacccgcggg tggtgtggac gaccgcgccg aagccgtcga tggcggacaa gatgtaccgc    540
gacgggttct gggactggcc gctgctggag cggcacgagc ggatgcactc gttcgagttc    600
tgcgtgaccc aggacgaggt ggtgttcgac gccgccgaca tgagccgctt cggccgcgac    660
atcgtggtgc aggagtcgat gaccaccaac cgggcgggca tcagctggct caagcggcac    720
ctggagccca agggcttccg ggtgcggccg gtgcacttcc cgctgcactt cttccctcg    780
cacatcgact gcacgttcgt gccgctcgcg ccggggctgg tgctgaccaa cccgaccgg    840
ccgctgcgcg agggtgagga agctgttctc tggccaacg actgggagct ggtgacgcg     900
ccggagccga ccacgggcaa cgacgagatg ccggagttct gccagtcctc gaagtggctg    960
tcgatgaacg tgctcagcat cggaccgaac aaggtcatcg cgagcagca ggagaagccg    1020
ctgcaggagc tgctgtacaa actggacttc gaggtcttcc cggtcccgtt ccgcaacgtg   1080
ttcgagtacg gcgggtcgct gcactgcgcc acctgggacg tccgccgggt cggcgcgggc   1140
gaggactact tccccaactc cgactaccag ccactggcct ga                       1182

SEQ ID NO: 3             moltype = DNA   length = 1176
FEATURE                  Location/Qualifiers
source                   1..1176
                         mol_type = other DNA
                         organism = unidentified
SEQUENCE: 3
atgcaaacaa gaattgtaaa tagctggaat gagtgggatg aactaaagga gatggttgtc     60
gggattgcaa atggtgctta ttttgaacca actgagccag gtaaccgccc tgctttacgc    120
gataagaaca ttgccaaaat gttctctttt cccaggggtc cgaaaaagca gaggtaaca    180
gagaaagcta atgaggagtt gaatgggctg gtagcgcttc tagaatcaca gggcgtaact    240
gtacgccgcc cagagaaaca taactttggc ctgtctgtga agacaccatt ctttgaggta    300
gagaatcaat attgtgcggt ctgcccacgt gatgttatga tcacctttgg gaacgaaatt    360
ctcgaagcaa ctatgtcacg gcggtcacgc ttctttgagt atttacccta tcgcaaacta    420
gtctatgaat attggcataa agatccagat atgacctgga atgctgcgcc taaaccgact    480
atgcaaaatg ccatgtaccg cgaagatttc tgggagtgtc cgatggaaga tcgatttgag    540
agtatgcatg attttgagtt ctgcgtcacc caggatgagg tgattttga cgcagcagac    600
tgtagccgct ttggccgtga tatttttgtg caggagtcaa tgaccgataa tcgtgcaggg    660
attcgctggc tcaaacggca tttagagccg cgtcgcttcc gcgtgcatga tattcacttc    720
ccactagata ttttcccatc ccacattgat gtgtactttg tccccttagc cctggggtt     780
gtgttagtga atccagatcg ccccatcaaa gagggtgaag agaaactctt catggataac    840
ggttggcaat tcatcgaagc acccctcccc acttccaccg acgatgagat gcctatgttc    900
tgccagtcca gtaagtggtt gtcgatgaat gtgttaagca tttcccccaa gaaggtcatc    960
tgtgaagagc aagagcatcc gcttcatgag ttgctagata aacacggctt tgaggtctat   1020
ccaattccct ttcgcaatgt cttttgagttt ggcggttcgc tccattgtgc cacctgggat   1080
atccatcgca cgggaacctg tgaggattac ttccctaaac taaactatac gccggtaact   1140
gcatcaacca atgcgtttc tcgcttcatc atttag                             1176

SEQ ID NO: 4             moltype = AA   length = 376
FEATURE                  Location/Qualifiers
source                   1..376
                         mol_type = protein
                         organism = unidentified
SEQUENCE: 4
MRTDTRIVNS WNEWDTLQEV VVGTAENACF EPTEPGHRPQ ERGLPEPRPF PTGPKPRELN     60
EKAEEELAGL VSLLETHGVT VRRPSPRDYS IPLKTPTFEV ENQYCAVCPR DVMITLGHEI    120
LEATMSRRSR YFEYEAYRSL VYEYWDQDPQ MTWSVAPKPS MADEMYRQDF WTWPLSKRHE    180
EMHNFEFCVT QDEVVFDAAD MARMGKDIFV QESMTTNRAG IRWLTRHLEP KGFRVHPVHF    240
```

-continued

```
PLDYFPSHID ATFIPLRAGL VLTNPERPIS SGEEKLFLAN DWEFVTAPQP LTGNDEMPRY    300
CQSSKWVSIN VLSISPSKII VEEQEKPLQD LLCSLGFEVL PLPFRHVYEY GGSLHCATWD    360
VRRDGGCEDY FPNQNV                                                    376

SEQ ID NO: 5             moltype = DNA  length = 20
FEATURE                  Location/Qualifiers
source                   1..20
                         mol_type = other DNA
                         organism = synthetic construct
SEQUENCE: 5
agcaaatggg tcgcggatcc                                                 20

SEQ ID NO: 6             moltype = DNA  length = 20
FEATURE                  Location/Qualifiers
source                   1..20
                         mol_type = other DNA
                         organism = synthetic construct
SEQUENCE: 6
gtggtgctcg agtgcggccg                                                 20

SEQ ID NO: 7             moltype = DNA  length = 21
FEATURE                  Location/Qualifiers
source                   1..21
                         mol_type = other DNA
                         organism = synthetic construct
SEQUENCE: 7
catgactggt ggacagcaaa t                                               21

SEQ ID NO: 8             moltype = DNA  length = 19
FEATURE                  Location/Qualifiers
source                   1..19
                         mol_type = other DNA
                         organism = synthetic construct
SEQUENCE: 8
gctttgttag cagccggat                                                  19

SEQ ID NO: 9             moltype = DNA  length = 23
FEATURE                  Location/Qualifiers
source                   1..23
                         mol_type = other DNA
                         organism = synthetic construct
SEQUENCE: 9
ctttggttcc aggtggcgtt gca                                             23

SEQ ID NO: 10            moltype = DNA  length = 19
FEATURE                  Location/Qualifiers
source                   1..19
                         mol_type = other DNA
                         organism = synthetic construct
SEQUENCE: 10
cgccacctgg aaccaaagg                                                  19

SEQ ID NO: 11            moltype = DNA  length = 18
FEATURE                  Location/Qualifiers
source                   1..18
                         mol_type = other DNA
                         organism = synthetic construct
SEQUENCE: 11
tcaggaccag gccagggc                                                   18

SEQ ID NO: 12            moltype = DNA  length = 20
FEATURE                  Location/Qualifiers
source                   1..20
                         mol_type = other DNA
                         organism = synthetic construct
SEQUENCE: 12
ggcctggtcc tgaccaaccc                                                 20

SEQ ID NO: 13            moltype = DNA  length = 24
FEATURE                  Location/Qualifiers
source                   1..24
                         mol_type = other DNA
                         organism = synthetic construct
SEQUENCE: 13
gaactcccaa tcgtttgcct tgaa                                            24

SEQ ID NO: 14            moltype = DNA  length = 22
FEATURE                  Location/Qualifiers
source                   1..22
```

```
                    mol_type = other DNA
                    organism = synthetic construct
SEQUENCE: 14
gcaaacgatt gggagttcgt ga                                            22
```

L-ARGININE-GLYCINE AMIDINOTRANSFERASE AND USE THEREOF IN THE PRODUCTION OF GUANIDINOACETIC ACID

This application is a Continuation Application of PCT/CN2023/098457, filed on Jun. 6, 2023, which claims priority to Chinese Patent Application No. 202310271233.4, filed on Mar. 20, 2023, which is incorporated by reference for all purposes as if fully set forth herein.

A Sequence Listing XML file named "10015_0144.xml" created on Jan. 18, 2024, and having a size of 16,701 bytes, is filed concurrently with the specification. The sequence listing contained in the XML file is part of the specification and is herein incorporated by reference in its entirety.

FIELD OF THE INVENTION

The present invention relates to an L-arginine-glycine amidinotransferase and use thereof in the production of guanidinoacetic acid, and belongs to the field of enzyme engineering technology.

DESCRIPTION OF THE RELATED ART

Guanidinoacetic acid (GAA) is a naturally occurring amino acid derivative that acts as a direct precursor to creatine and acts as a source of creatine in tissues that require high energy. Because of the cost-effectiveness and high stability in aqueous solution and the non-specific transport characteristics compared with creatine, GAA has been studied as a nutritional additive. By supplementing GAA, the cellular bioenergy in diseases characterized by low brain creatine and creatine synthesizing functional enzymes, including neurodegenerative diseases, brain tumors or cerebrovascular diseases, can be restored. In addition, GAA has no mutagenicity or genotoxicity, and causes no risk to the environment. In view of the wide use of GAA, it has great demand in industry.

At present, GAA is chemically synthesized mainly by the reaction of glycine or sodium glycinate with a guanosine acylating agent (such as O-alkylisourea or cyanamide). The production process requires high temperature and high pressure, and is not friendly to the environment. In addition, the purification process is very troublesome, and the product is susceptible to contamination by the initial acylating agent or toxic substances. Therefore, the production of GAA from renewable resources by means of biological technologies is desirable.

Studies show that in the presence of L-arginine-glycine amidinotransferase (AGAT, EC:2.1.4.1) as a catalyst, guanidinoacetic acid and L-ornithine can be produced with L-arginine and glycine as substrates. Because this enzyme exists in most animals and few prokaryotes, the studies of this enzyme in microorganisms are fewer. The enzyme is also found to be less soluble expressed in microorganisms, and tends to be inhibited by L-ornithine. Therefore, there are still many limitations in the enzymatic production of guanidinoacetic acid, the conversion rate and yield are low, and further exploration is still needed.

SUMMARY OF THE INVENTION

To solve the above technical problems, by screening L-arginine-glycine amidinotransferase (AGAT) of various sources and determining related properties, L-arginine-glycine amidinotransferase AkAGAT having a good catalytic performance is obtained in the present invention. The enzyme activity is improved by mutation, and then the enzyme is introduced into a host strain, to obtain an engineered E. coli strain and further produce guanidinoacetic acid.

A first object of the present invention is to provide an L-arginine-glycine amidinotransferase. The L-arginine-glycine amidinotransferase has a sequence obtained by a mutation of the amino acid at position 225 in the enzyme having an amino acid sequence as shown in SEQ ID NO: 4 into glutamine.

Preferably, in the L-arginine-glycine amidinotransferase the alanine at position 258 is mutated into proline.

Preferably, in the L-arginine-glycine amidinotransferase the leucine at position 278 is mutated into lysine.

A second object of the present invention is to provide a gene encoding L-arginine-glycine amidinotransferase.

A third object of the present invention is to provide a recombinant expression vector carrying the gene.

A fourth object of the present invention is to provide a recombinant strain expressing the L-arginine-glycine amidinotransferase.

Preferably, E. coli BL21 (DE3) is used as a host and pET-28a plasmid is used as an expression vector in the recombinant strain.

A fifth object of the present invention is to provide a method for producing guanidinoacetic acid by catalyzing the reaction of arginine and glycine to produce guanidinoacetic acid using the L-arginine-glycine amidinotransferase or the recombinant strain as a catalyst.

Preferably, in the catalytic reaction system with the recombinant strain as a catalyst, 0.08-0.12 M Tris-HCl is used as a buffer, and the recombinant strain is added in such an amount that $OD_{600}$ is 30-50.

Preferably, in the catalytic reaction system, the arginine content is 50-200 mM, the glycine content is 50-200 mM, and arginine:glycine=1:2-2:1.

Preferably, in the catalytic reaction system, 0.5-2% by weight of Triton is added. Preferably, the catalytic reaction temperature is 30-40° C., and the initial pH is 7-8.

As compared with the prior art, the invention has the following beneficial effects:

In the present invention, by selecting L-arginine-glycine amidinotransferase of various sources and comparing the enzyme activities, an AGAT enzyme with a higher enzyme activity is screened out. The L-arginine-glycine amidinotransferase with the optimum enzyme activity is mutated, a mutant enzyme $AkAGAT_{T225Q/A258P/L278K}$ having improved enzyme activity is obtained. The soluble expression level of the mutant enzyme is improved, and the catalytic activity is increased by 45.6 compared to the raw enzyme, thus breaking through the shortcoming of low efficiency in the previous enzymatic production of guanidinoacetic acid.

In the present invention, the screened L-arginine-glycine amidinotransferase mutant is used in the production of guanidinoacetic acid. By optimizing the whole-cell catalytic conditions, the obtained strain is used for producing GAA in a 1 L system. After 24 hrs of reaction, the final yield can reach 21.4 g/L, which is increased by 49.6%, compared with production of guanidinoacetic acid with the raw enzyme.

DETAILED DESCRIPTION OF THE PREFERRED EMBODIMENTS

Figure 1:
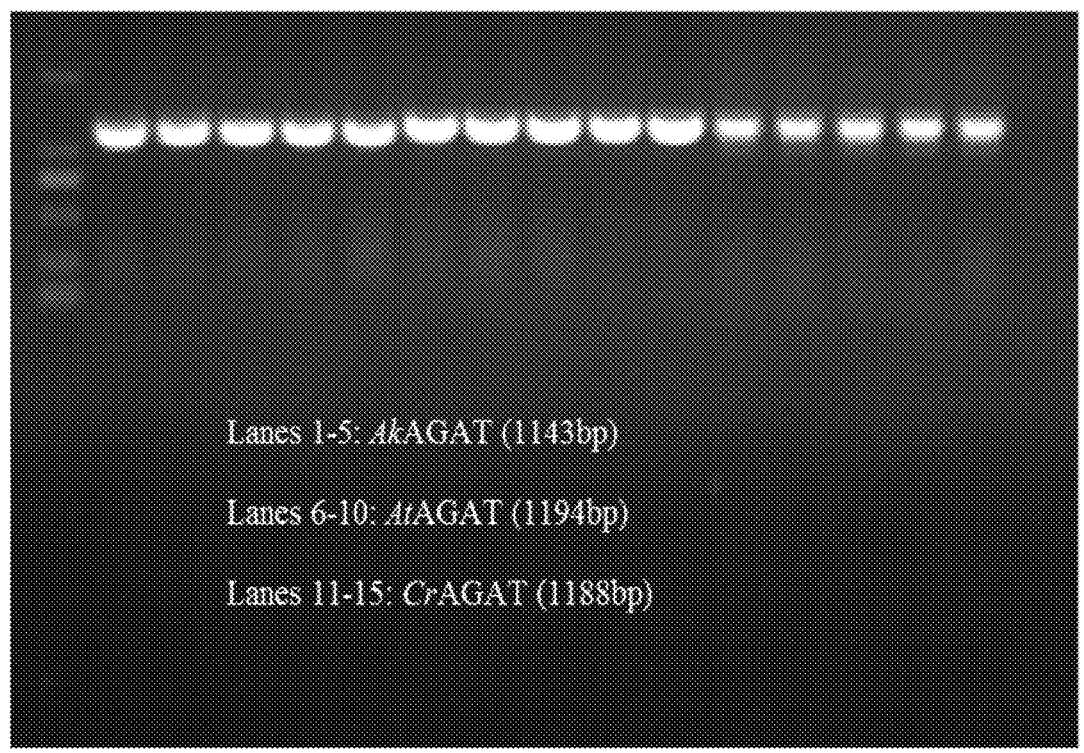
FIG. 1 is an electrophoretogram showing the construction verification results of pET-28a-AkAGAT, pET-28a-AcAGAT, and pET-28a-CrAGAT.

The present invention will be further described below in connection with specific examples, so that those skilled in the art can better understand and implement the present invention; however, the present invention is not limited thereto.

Unless otherwise stated, the experimental methods given in examples below are all conventional methods.

The materials and reagents used in examples below are commercially available, unless otherwise specified.

For the quantitative experiments in the following examples, three repeats are set and the results were averaged.

The host of the expression vector in the following examples is *E. coli* BL21 (DE3), purchased from Bena Bio, and the pET-28a plasmid is purchased from BioVector Plasmid Vector Strain Cell Gene Collection Center.

Preparation and Chemical Transformation of *Escherichia coli* Competent Cells Involved in Examples:
  *Escherichia coli* competent cells for transformation are prepared using the Competent Cell Preparation Kit from TakaRa. For detailed operations, refer to the instruction. The *E. coli* BL21 cells are transformed by thermal shock at 42° C., and screened on an antibiotic resistant plate to obtain a positive transformant. The plasmid is extracted for verification by PCR and sent to GENEWIZ for sequencing.

Extraction Method of Related Plasmids Involved in Examples:
  When the plasmid is extracted from a recombinant *E. coli* strain, the cell culture incubated to have an appropriate concentration is centrifuged, the supernatant is removed, and then the plasmid is extracted using a Plasmid Mini Preparation Kit from Generay. For detailed operations, refer to the instruction.

Culture Media Involved in Examples:
  LB liquid medium (g/L): 5 yeast extract, 10 tryptone, 10 sodium chloride.
  LB solid medium: On the basis of LB liquid medium, 1.5-2.0% agar powder is added.

Determination Method of L-Arginine-Glycine Amidinotransferase Enzyme Activity:
  (1) Enzyme activity determining system: 100 mM Tris-HCl (pH=7), 120 mM L-arginine, 120 mM glycine, in which an appropriate amount of enzyme solution is added.
  (2) Enzyme activity determining method: The reaction is continued at 35° C. and 200 rpm for 1 hr, then terminated by adding 750 µL $HClO_4$, left to stand for 10 min, and centrifuged to remove the precipitate. 500 µL reaction solution+500 µL acetic acid+500 µL ninhydrin solution are taken, and reacted at 100° C. for 1 hr. After cooling, the absorbance is measured at 515 nm.

Definition of enzyme activity: Under standard reaction conditions, the amount of enzyme needed to catalyze the production of 1 µmol guanidinoacetic acid every 1 min is 1 unit of enzyme activity.

Determination method of specific enzyme activity of L-arginine-glycine amidinotransferase: The enzyme activity of purified L-arginine-glycine amidinotransferase ($U·mL^{-1}$) is determined, and the protein content of purified L-arginine-glycine amidinotransferase ($mg·mL^{-1}$) is determined by the Bradford method, to calculate the specific enzyme activity of L-arginine-glycine amidinotransferase.

The specific enzyme activity of L-arginine-glycine amidinotransferase is calculated by the formula:
  Specific enzyme activity ($U·mg^{-1}$) of L-arginine-glycine amidinotransferase=enzyme activity of purified L-arginine-glycine amidinotransferase ($U·mL^{-1}$)/protein content of purified L-arginine-glycine amidinotransferase ($mg·mL^{-1}$).

Detection Methods Involved in Examples:
  Detection of protein concentration: The protein concentration is determined by using the Bradford kit, with bovine serum protein as a standard.
  Sample detection method: Guanidinoacetic acid is detected by Agilent high performance liquid chromatograph (equipped with an ultraviolet absorber). The chromatographic column is Waters XBridge BEH Amide 5 µm column (4.6 mm×250 mm). The mobile phase is 30% acetonitrile aqueous solution, the detection wavelength is 210 nm, and the flow rate is 0.6 mL/min.

L-arginine, glycine, and L-ornithine are detected by using Agilent C18, 5 µm, 4.6×250 mm chromatographic column. The flow rate is 1.0 $mL·min^{-1}$; the column temperature is 40° C.; and the detection wavelength is 338 nm. Mobile phase: phase A: 8.0 g sodium acetate (13.3 g sodium acetate trihydrate) is dissolved in 1000 mL water, 225 µL triethyl amine is added, the pH value is adjusted to 7.20±0.05 with 5% acetic acid, and finally 5 mL tetrahydrofuran is added and mixed; phase B: 6.0 g sodium acetate is weighed and dissolved in 200 mL water, and the pH value is adjusted to 7.20±0.05 with 5% acetic acid. This solution was added with 400 mL HPLC grade methanol and 400 mL HPLC grade ethanol, and mixed.

Example 1: Screening and Expression of Heterologous AGAT with High Enzyme Activity The specific steps were as follows.
1. Construction of Recombinant Strains BL21/pET-28a-AkAGAT, BL21/pET-28a-AcAGAT, and BL/pET-28a-CrAGAT In order to obtain AGAT with higher enzyme activity, gene sequences encoding AGAT (as shown in SEQ ID NO:

1, SEQ ID NO: 2, and SEQ ID NO: 3 respectively) derived from *Amycolatopsis kentuckyensis, Actinokineospora terrae*, and *Cylindrospermopsis raciborskii* AWT205 were obtained respectively by searching Brenda database and NCBI BLAST, and synthesized by GENEWIZ. The agat gene fragments obtained were respectively ligated to the linearized plasmid pET-28a (amplification with P1/P2) by the homologous recombination enzyme ClonExpress II One Step Cloning Kit (Vazyme), and transformed into *E. coli* BL21(DE3) competent cells, to obtain transformants. The transformants were coated in an LB solid medium containing kanamycin with a concentration of 50 μg/mL, and cultured at 37° C. for 12 hrs. The positive clone was picked up, and the single colony was verified by colony PCR using P3/P4 as primers and using Taq DNA polymerase (FIG. 1). 12 hrs after the positive single colony with the target band size was inoculated in a vial containing LB liquid medium, the plasmid was extracted, and sequenced to be correct by GENEWIZ. The successfully constructed recombinant strains were designated as BL21/pET-28a-AkAGAT, BL21/pET-28a-AcAGAT, and BL21/pET-28a-CrAGAT respectively. Primer sequences involved:

P1:
(SEQ ID NO: 5)
5'-AGCAAATGGGTCGCGGATCC-3'

P2:
(SEQ ID NO: 6)
5'-GTGGTGCTCGAGTGCGGCCG-3'

P3:
(SEQ ID NO: 7)
5'-CATGACTGGTGGACAGCAAAT-3'

P4:
(SEQ ID NO: 8)
5'-GCTTTGTTAGCAGCCGGAT-3'

2. Expression and Purification of L-Arginine-Glycine Amidinotransferase

Figure 2:
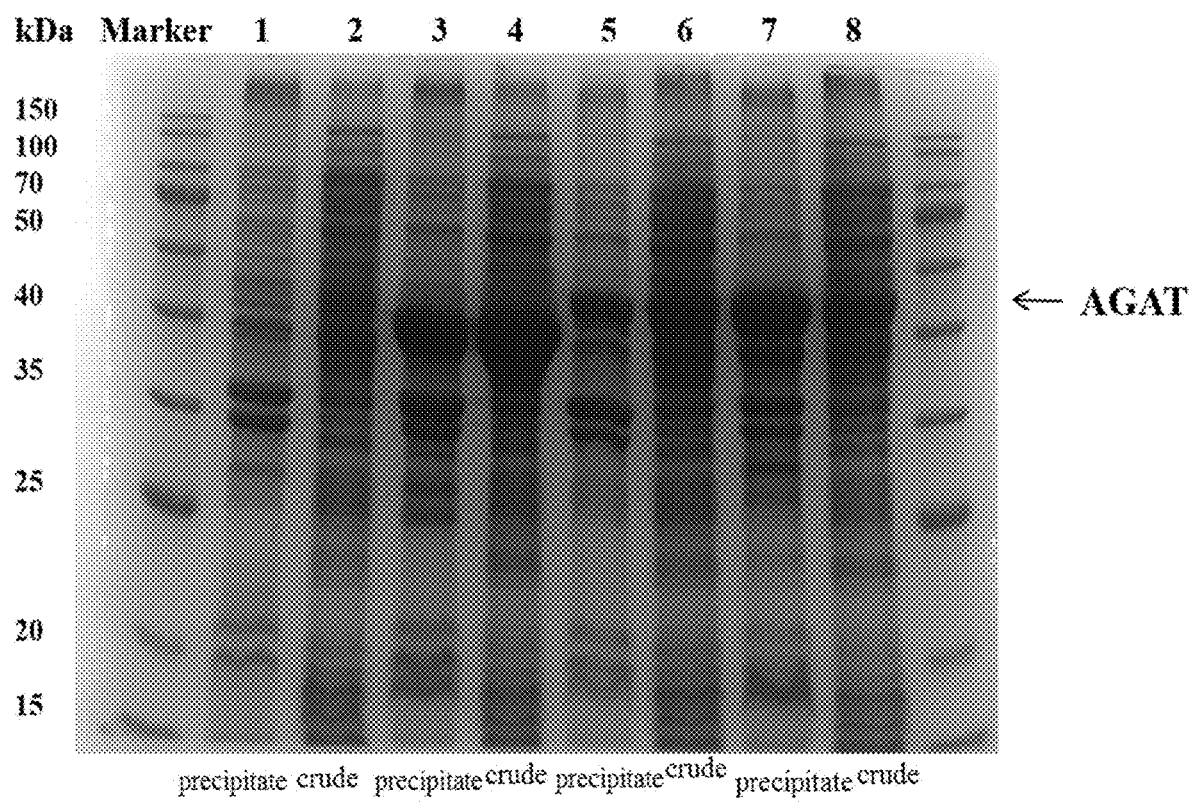
FIG. 2 is an SDS-PAGE electrophoretogram showing L-arginine-glycine amidinotransferase AGAT of various sources in Example 1, in which Lanes 1 and 2 are respectively a precipitate and a crude enzyme solution of pET-28a plasmid, Lanes 3 and 4 are respectively a precipitate and a crude enzyme solution of pET-28a-AkAGAT, Lanes 5 and 6 are respectively a precipitate and a crude enzyme solution of pET-28a-AtAGAT, and Lanes 7 and 8 are respectively a precipitate and a crude enzyme solution of pET-28a-CrA-GAT.
Figure 3:
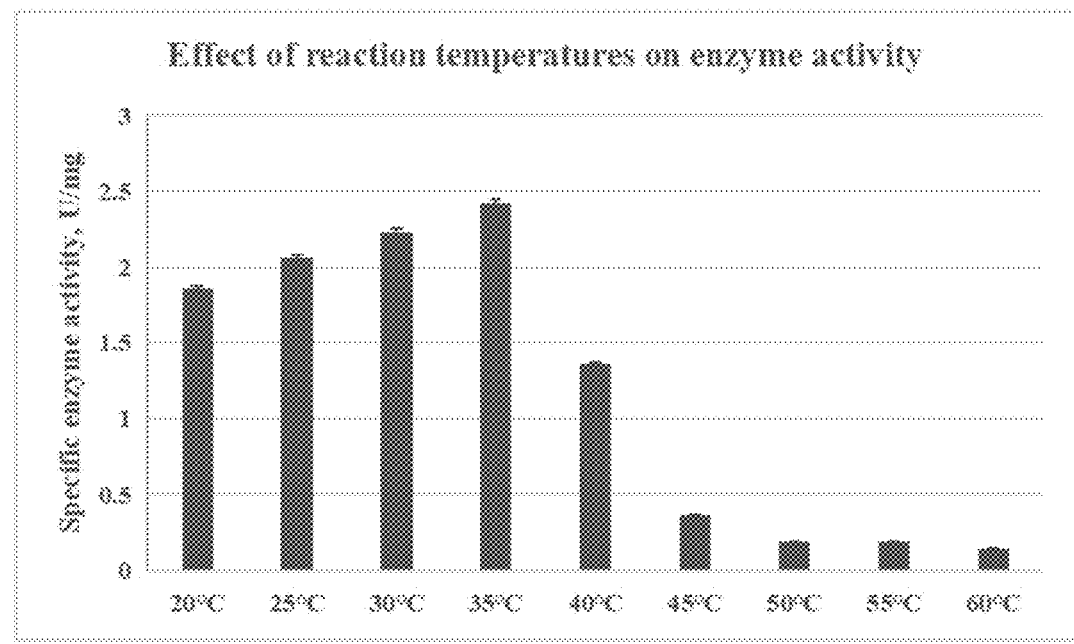
FIG. 3 shows the effect of temperature on AkAGAT enzyme activity in Example 2.
Figure 4:
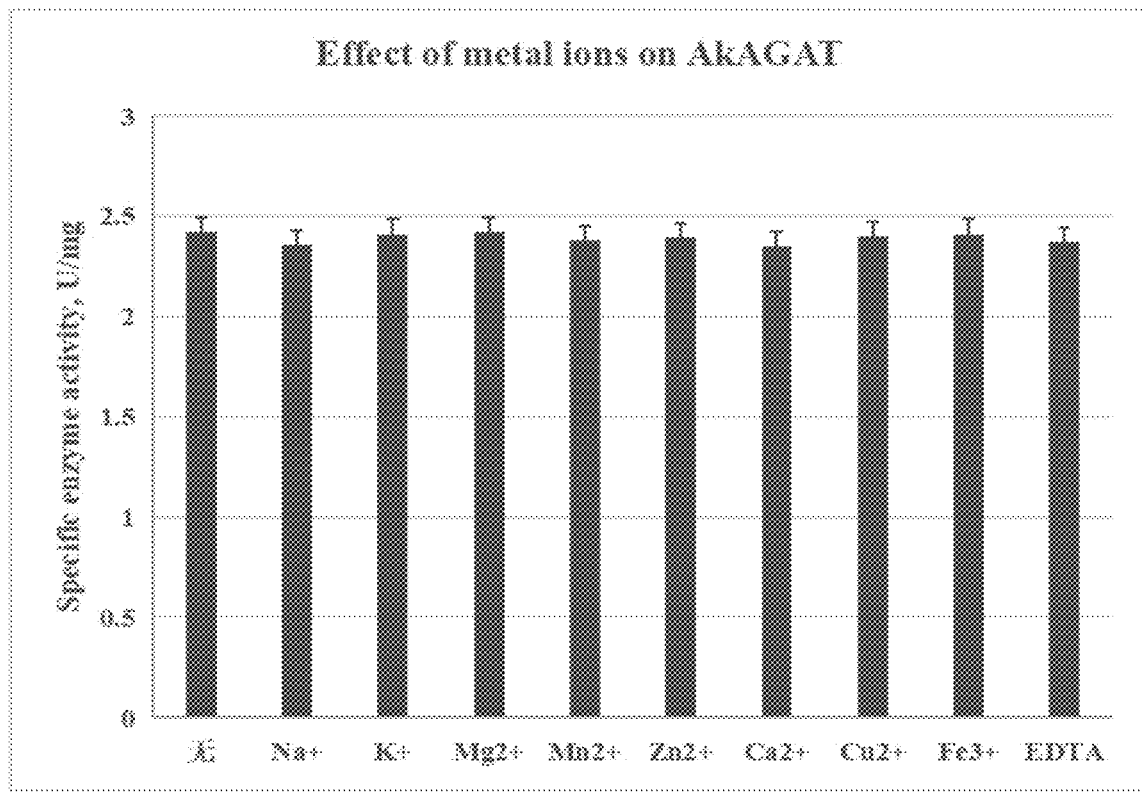
FIG. 4 shows the effect of various metal ions on AkAGAT in Example 2.
Figure 5:
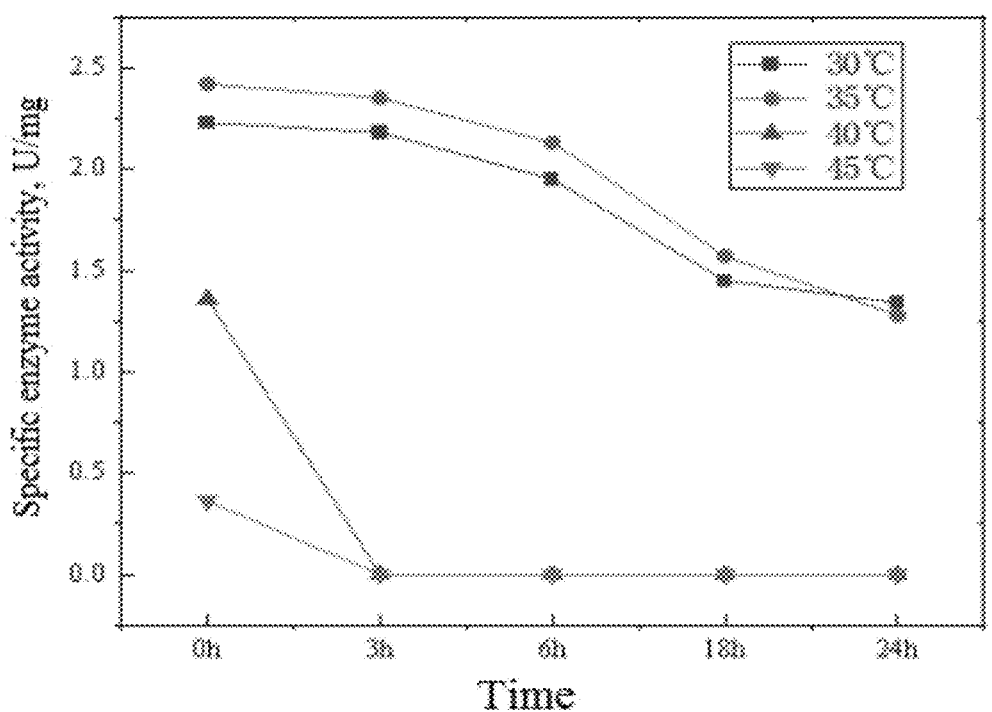
FIG. 5 shows the exploration on stability against temperature of AkAGAT enzyme in Example 2.
Figure 6:
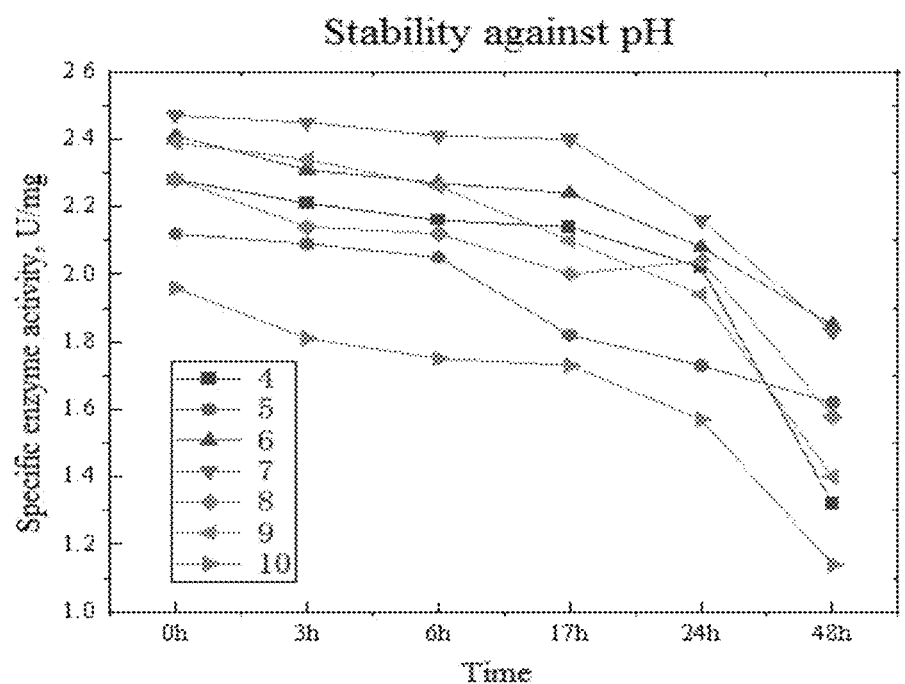
FIG. 6 shows the exploration on stability against pH of AkAGAT enzyme in Example 2.

The single colony of the recombinant strain successfully constructed above was inoculated into 10 mL of LB liquid medium, and cultured at 37° C. for 12 hrs. Then 1% of the cell culture was inoculated into 50 mL of LB liquid medium, and cultured to an $OD_{600}$ of about 0.8. IPTG was added, and the cells were cultured at 16° C. for 16 hrs. The cells were washed three times with PBS. The collected cells were resuspended in PBS, and homogenized by an ultrasonic homogenizer, for a total time of 15 min with 3 s break after 1 s homogenization, and then centrifuged at 10000 rpm, for 20 min. The supernatant was subject to gel electrophoresis. All the proteins are shown to be solublely expressed, as shown in FIG. 2. The crude enzyme solution was purified by passing through a nickel column for protein purification, and the pure enzyme was verified by gel electrophoresis.

The pure enzyme was added into a reaction solution containing the same concentration of substrate, and the activity of L-arginine-glycine amidinotransferase from various sources was determined according to the above enzyme activity determination method. The result shows that AkAGAT derived from *Amycolatopsis kentuckyensis* has higher catalytic performance, and has a specific enzyme activity of 2.23±0.03 U/mg. The enzyme was selected for subsequent experiments.

TABLE 1

Comparison of specific enzyme activity of L-arginine-glycine amidinotransferase from various sources

| Enzyme | Specific enzyme activity, U/mg |
|---|---|
| AkAGAT | 2.23 ± 0.07 |
| AtAGAT | 1.44 ± 0.04 |
| CrAGAT | 1.23 ± 0.02 |

Example 2: Activity Analysis of AkAGAT Pure Enzyme

In the following experiment, purified AkAGAT enzyme was used, which was obtained by inducing the strain obtained in Step 2 in Example 1 to express at 16° C. and then purifying.

The enzyme activity was studied at various reaction temperatures (20-60° C.), at various pH values (3-10), and in the presence of various metal ions ($Na^+$, $K^+$, $Mg^{2+}$, $Mn^{2+}$, $Zn^{2+}$, $Ca^{2+}$, $Cu^{2+}$, $Fe^{3+}$, EDTA), and the stability against temperature and the stability against pH were determined. The results are shown in FIGS. 3-6. The optimum reaction temperature is 35° C., the optimum pH is 7, metal ions have no effect on the enzyme activity, the thermal stability is poor, and the enzyme is resistant to acids, but not bases.

Example 3: Mining and Selection of Mutable Sites in Gene Encoding L-Arginine-Glycine Amidinotransferase Based on the research in Example 1 and Example 2, the thermal stability of AkAGAT is poor, the enzyme activity needs to be improved, and the enzyme needs to be modified. The specific steps were as follows.

1. Preparation of AkAGAT Enzyme Mutant

In the present invention, L-arginine-glycine amidinotransferase (AkAGAT) derived from *Amycolatopsis kentuckyensis* was used as a parent and modified. The mutant proposed in the present invention has at least multiple mutations at sites 225, 258, and 278 compared with the amino acid sequence of AkAGAT as shown in SEQ ID NO: 4. The mutant has at least one of the following mutations: T225Q, A258P, L278K.

PCR amplification system: Primer F 1.0 μL, Primer R 1.0 μL, Template 1.0 μL, PhantaR Max (p515) DNA polymerases 25 μL, Nuclease-free water 22 μL Procedure for PCR amplification: pre-denaturation at 95° C. for 5 min; 30 cycles of denaturation at 95° C. for 30 s, annealing generally at a temperature of 58-60° C., for 30-60 s, and extension at 72° C. for a time set according to the amplification rate of 1500 bp per minute; and extension at 72° C. for 5 min; The product was stored at 4° C. By using P5 and P6 as the primers and pET-28a-AkAGAT constructed in Example 1 as a template, pET-28a-AkAGAT was reversely amplified by PCR using the above PCR amplification system and PCR amplification conditions to obtain the $AkAGAT_{T225Q}$ mutant. The amplification product was separated by 1.5% agarose gel electrophoresis and then recovered by using a commercial kit. The plasmid pET-28a-$AkAGAT_{T225Q}$ mutant was obtained, which was then transformed into *E. coli* BL21 (DE3) competent cells. A cloned colony having L-arginine-glycine amidinotransferase activity were screened out on a Luria broth (LB) plate (containing 50 mg/L kanamycin). DNA of the plasmid pET-28a-$AkAGAT_{T225Q}$ mutant was extracted from the cloned colony, and sequenced to determine that the introduced site mutations were correct. Thus, a recombinant strain with the enzyme mutant was obtained.

By using P7 and P8 as the primers and the constructed pET-28a-AkAGAT$_{T225Q}$ as a template, pET-28a-AkAGAT$_{T225Q}$ was reversely amplified by PCR using the above PCR amplification system and PCR amplification conditions to obtain the AkAGAT$_{T225Q/A258P}$ mutant. The amplification product was separated by 1.5% agarose gel electrophoresis and then recovered by using a commercial kit. The plasmid pET-28a-AkAGAT$_{T225Q/A258P}$ mutant was obtained, which was then transformed into E. coli BL21 (DE3) competent cells. A cloned colony having L-arginine-glycine amidinotransferase activity were screened out on a Luria broth (LB) plate (containing 50 mg/L kanamycin). DNA of the plasmid pET-28a-AkAGAT$_{T225Q/A258P}$ mutant was extracted from the cloned colony, and, sequenced to determine that the introduced site mutations were correct. Thus, a recombinant mutant strain was obtained.

By using P9 and P10 as the primers and the constructed pET-28a-AkAGAT$_{T225Q/A258P}$ as a template, pET-28a-AkAGAT$_{T225Q/A258P}$ was reversely amplified by PCR using the above PCR amplification system and PCR amplification conditions to obtain the AkAGAT$_{T225Q/A258P/L278K}$ mutant. The amplification product was separated by 1.5% agarose gel electrophoresis and then recovered by using a commercial kit. The plasmid pET-28a-AkAGAT$_{T225Q/A258P/L278K}$ mutant was obtained, which was then transformed into E. coli BL21 (DE3) competent cells. A cloned colony having L-arginine-glycine amidinotransferase activity were screened out on a Luria broth (LB) plate (containing 50 mg/L kanamycin). DNA of the plasmid pET-28a-AkAGAT$_{T225Q/A258P/L278K}$ mutant was extracted from the cloned colony, and sequenced to determine that the introduced site mutations were correct. Thus, a recombinant strain with the enzyme mutant was obtained.

```
P5:
                                        (SEQ ID NO: 9)
5'CTTTGGTTCCAGGTGGCGTTGCA-3'

P6:
                                        (SEQ ID NO: 10)
5'-CGCCACCTGGAACCAAAGG-3'

P7:
                                        (SEQ ID NO: 11)
5'-TCAGGACCAGGCCAGGGC-3'

P8:
                                        (SEQ ID NO: 12)
5'-GGCCTGGTCCTGACCAACCC-3'

P9:
                                        (SEQ ID NO: 13)
5'-GAACTCCCAATCGTTTGCCTTGAA-3'

P10:
                                        (SEQ ID NO: 14)
5'-GCAAACGATTGGGAGTTCGTGA-3'
```

2. Expression and Determination of Enzyme Activity of AkAGAT Enzyme Mutant

The single colony of AkAGAT mutant strain constructed above was inoculated into 10 mL of LB liquid medium (containing 50 mg/L kanamycin), and cultured at 37° C. for 12 hrs. Then 1% of the cell culture was inoculated into 50 mL of LB liquid medium, and cultured to an OD$_{600}$ of about 0.8. IPTG was added, and the cells were cultured at 16° C. for 16 hrs. The cells were washed three times with PBS. The collected cells were resuspended in PBS, and homogenized by an ultrasonic homogenizer. The crude enzyme solution was purified by passing through a nickel column for protein purification, to obtain purified AkAGAT enzyme mutant. The activity of the AkAGAT enzyme mutant was determined according to the above enzyme activity determination method. The results are shown in Table 2.

Figure 7:
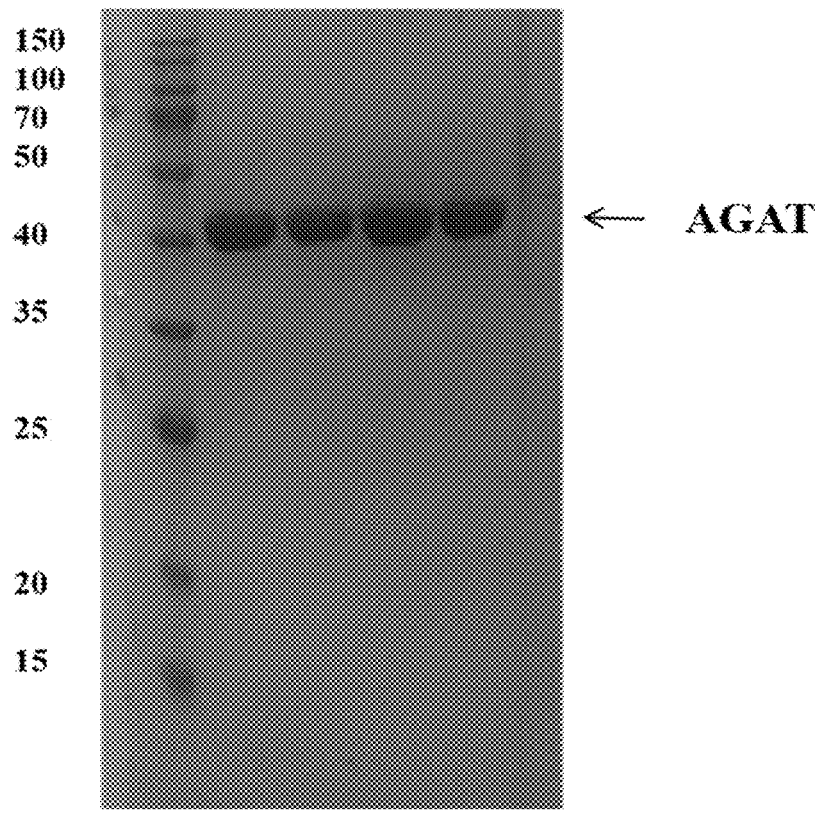
FIG. 7 is an SDS-PAGE electrophoretogram of AkAGAT mutant in Example 3, in which Lanes 1, 2, 3, and 4 are respectively AkAGAT, $AkAGAT_{T225Q}$, $AkAGAT_{T225Q/A258P}$, $AkAGAT_{T225Q/A258P/L278K}$ pure enzyme.

The mutant enzyme is expressed in a soluble form, and at a higher level than that of wild type (see FIG. 7). Moreover, the thermal stability of the mutants AkAGAT$_{T225Q}$, AkAGAT$_{T225Q/A258P}$, and AkAGAT$_{T225Q/A258P/L278K}$ were determined at 30° C., 35° C., 40° C., and 45° C. It is found that at 40° C. and 45° C., the stability of the three mutants is improved. After 6 hrs, 30%-35% of the enzyme activity of the three mutants remains.

The enzyme activities of the mutants AkAGAT$_{T225Q}$, AkAGAT$_{T225Q/A258P}$, and AkAGAT$_{T225Q/A258P/L278K}$ are improved by 21.1%, 32%, and 36.7% respectively, compared to the wide type. The catalytic activity of AkAGAT$_{T225Q/A258P/L278K}$ is improved most obviously, and the specific enzyme activity can be up to 3.52±0.21 U/mg. BL21/pET-28a-AkAGAT$_{T225Q/A258P/L278K}$ is used in subsequent experiments.

TABLE 2

Comparison of enzyme activities of different AkAGAT mutants

| Enzyme | Specific enzyme activity, U/mg |
| --- | --- |
| AkAGAT | 2.23 ± 0.07 |
| AkAGAT$_{T225Q}$ | 2.70 ± 0.08 |
| AkAGAT$_{T225Q/A258P}$ | 2.94 ± 0.20 |
| AkAGAT$_{T225Q/A258P/L278K}$ | 3.52 ± 0.21 |

Example 4: Production of Guanidinoacetic Acid Using AkAGAT Mutant Enzyme

The specific steps were as follows.

1. Comparison of Production of Guanidinoacetic Acid by Whole Cell Catalysis with Various AkAGAT Mutants The recombinant strains E. coli BL21/pET28a-AkAGAT, E. coli BL21/pET28a-AkAGAT$_{T225Q}$, E. coli BL21/pET28a-AkAGAT$_{T225Q/A258P}$, and E. coli BL21/pET28a-AkAGAT$_{T225Q/A258P/L278K}$ were induced to express as described in Example 1. The cells were washed three times with PBS. The collected cells were resuspended in 100 mM PBS. The catalytic reaction was carried out at an initial reaction pH controlled to 7.0, a reaction temperature of 30° C., a rotational speed of 200 rpm, and a substrate concentration of 120 mM. During the reaction, samples were taken at 0, 6, 12, 18, and 24 hrs. The sample was centrifuged at 12000 g/min for 10 min. The supernatant was collected, and passed through a 0.22 μm filter membrane, and the yield of guanidinoacetic acid was determined by HPLC.

Figure 8:
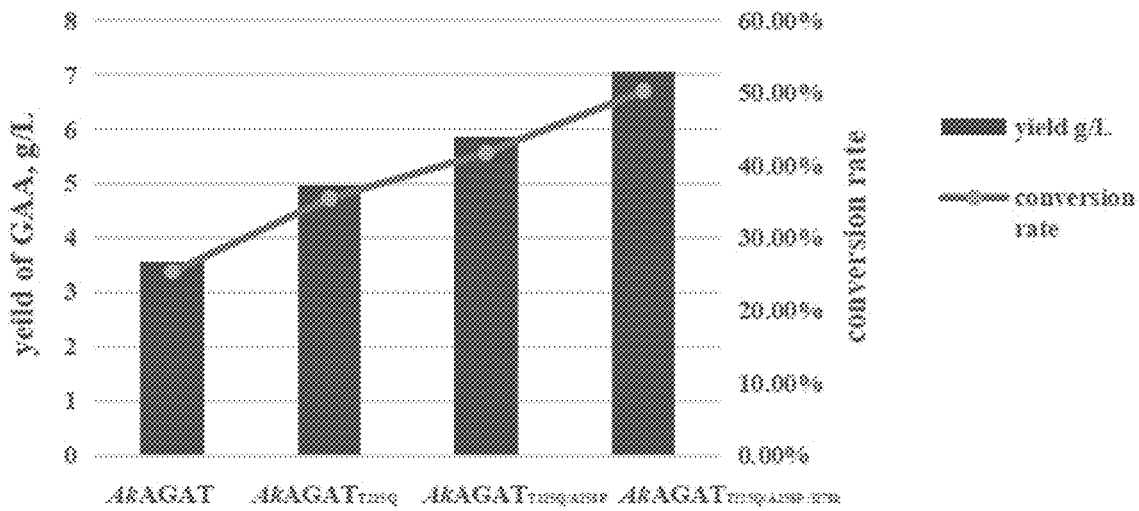
FIG. 8 compares the production of guanidinoacetic acid by whole cell conversion with various AkAGAT mutants.

By determining the yield of guanidinoacetic acid in the samples taken in various periods, it is found that there is no related enzyme degrading guanidinoacetic acid in Escherichia coli. With the extension of conversion time, the yield of guanidinoacetic acid increases constantly. The results are shown in FIG. 8. After 24 hrs of reaction, 7.06 g/L guanidinoacetic acid can be obtained in the reaction system involving AkAGAT$_{T225Q/A258P/L278K}$ enzyme, and the conversion rate is 50.28%, which is 49.6%, 29.4%, and 17% higher than that in the systems involving AkAGAT, AkAGAT$_{T225Q}$, and AkAGAT$_{T225Q/A258P}$ respectively. Therefore, the mutant enzyme AkAGAT$_{T225Q/A258P/L278K}$ can significantly improve the catalytic efficiency, save the reaction cost, and improve the yield of guanidinoacetic acid.

2. Optimization of Conditions for Producing Guanidinoacetic Acid by Mutant Enzyme AkAGAT$_{T225Q/A258P/L278K}$ In order to achieve the optimum conversion effect, the conversion conditions need to be optimized, mainly with respect to the type of buffer, cell concentration, substrate concentration and the amount of permeabilizer in the conversion system.

Effects of various buffers on GAA production: After the cells were collected, the cells were suspended and concentrated into PBS buffer/Tris-HCl buffer/MOPS buffer. The same volume of cell concentrate was added into a 50 mL triangular flask, and the final cell concentration in the reaction system was 30. The reaction was continued for 24 hrs in a whole cell catalytic system of 0.1M PBS/Tris-HCl/MOPS (pH=7.4), with a substrate concentration of 120 mM, at a reaction temperature of 35° C., and a rotational speed of 200 rpm. Samples were taken at 0, 6, 12, 18, and 24 hrs, and centrifuged at 12000 rpm for 10 min. The supernatant was collected, 10-fold diluted, and filtered through a 0.22 µm filter membrane. The yield of GAA was determined by HPLC. The result shows that 0.1 M Tris-HCl is more suitable for this conversion system, where the yield of GAA reaches 8.41 g/L, which is increased by 19.7% and 12% compared with 0.1M PBS/MOPS respectively.

Effects of various cell concentrations on GAA production: After the cells were collected, the cells were suspended and concentrated to an appropriate volume, and the cell concentration was determined (OD$_{600}$). Various volumes of the cell concentrates were respectively added to a 50 mL triangular flask, and the final cell concentrations in the reaction system were 10, 20, 30, 40, 50 and 60 respectively. The reaction was continued for 24 hrs in a whole cell catalytic system of 0.1M Tris-HCl (pH=7.4), with a substrate concentration of 120 mM, at a reaction temperature of 35° C., and a rotational speed of 220 rpm. Samples were taken at 0, 6, 12, 18, and 24 hrs, and centrifuged at 12000 rpm for 10 min. The supernatant was collected, 10-fold diluted, and filtered through a 0.22 µm filter membrane. The yield of GAA was determined by HPLC. The result shows that when OD$_{600}$=40, the yield of GAA is the highest and is 9.12 g/L.

TABLE 3

Effects of various cell concentrations on GAA production

| Cell concentration (OD$_{600}$) | 10 | 20 | 30 | 40 | 50 | 60 |
|---|---|---|---|---|---|---|
| GAA concentration (g/L) | 6.60 | 8.30 | 7.59 | 9.12 | 8.60 | 8.71 |

Figure 9:
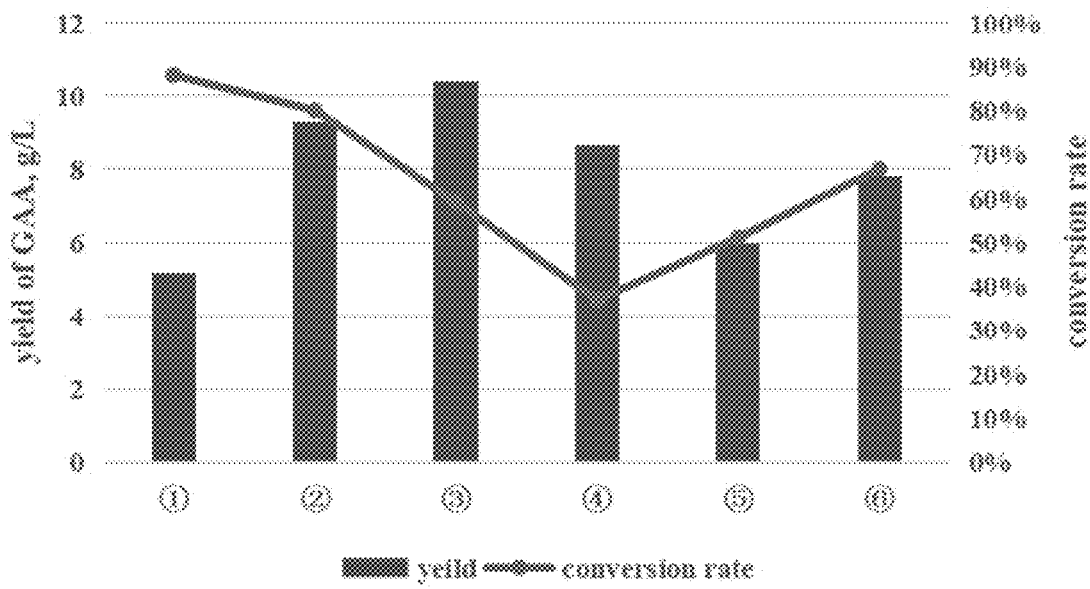
FIG. 9 shows the effect of different substrate concentrations on the production of GAA in the conversion system.

Effect of substrate concentrations on GAA synthesis: With the optimum cell concentration, various concentrations of substrates were respectively added into the system, including ①Arg 50 mM, Gly 50 mM, ②Arg 100 mM, Gly 100 mM, ③Arg 150 mM, Gly 150 mM, ④Arg 200 mM, Gly 200 mM, ⑤Arg 50 mM, Gly 100 mM, and ⑥Arg 100 mM, Gly 50 mM. After the reaction, samples were taken, the yield of GAA was determined, and the maximal conversion rate was calculated. The result is shown in FIG. 9. When OD$_{600}$ is 40, it is found that when arginine:glycine=1:1 is used as the substrate and the substrate concentration is 150 mM, the yield is the highest, but the conversion rate is less high. When the substrate concentration is 50 mM, the conversion rate is the highest, but the yield is low. When the substrate concentration is 100 mM, the yield and the conversion rate are both high, the yield is 9.31 g/L, and the conversion rate is 80%. In addition, when arginine:glycine is 1:2 and arginine:glycine is 2:1, the yield is lower than that when the ratio is 1:1.

In summary, in the subsequent experiments, 0.1M Tris-HCl was used as the buffer system, the cells were added to give an OD$_{600}$ of 40, and L-arginine and glycine were added at a ratio of 1:1 and have a concentration of 100 mM respectively, for production of guanidinoacetic acid by whole cell conversion.

3. Scaling Up of Conversion to Guanidinoacetic Acid

In order to efficiently produce guanidinoacetic acid by conversion by recombinant E. coli BL21/pET28a-AkAGAT$_{T225Q/A258P/L278K}$, the conversion by the recombinant strain in a large-scale system was studied under the optimized whole-cell catalytic conditions. The cells were suspended in 1 L 0.1M Tris-HCl buffer, the reaction temperature was controlled to 35° C., the initial pH was 7.4, the substrates L-arginine and glycine were each 200 mM, 1% Triton was added, and the cell concentration was such that OD$_{600}$ was 40. The conversion was carried out under these conditions. The content of each component in the conversion solution was detected by liquid chromatography.

The result shows that the reaction proceeds smoothly with time, during which L-arginine and glycine are consumed to produce guanidinoacetic acid, and the conversion system gradually becomes stable after 24 hrs of catalytic reaction. At a substrate concentration of 200 mM, a total of 21.4 g·L$^{-1}$ guanidinoacetic acid is produced, with a conversion rate of 90.4%.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims. The scope of the present invention is defined by the appended claims.

What is claimed is:

1. An L-arginine-glycine amidinotransferase comprising all of SEQ ID NO: 4 except for
   (i) a glutamine at the position corresponding to position 225 of the polypeptide of SEQ ID NO: 4;
   (ii) a glutamine at the position corresponding to position 225 of the polypeptide of SEQ ID NO: 4, and a proline at the position corresponding to position 258 of the polypeptide of SEQ ID NO: 4, or
   (iii) a glutamine at the position corresponding to position 225 of the polypeptide of SEQ ID NO: 4, a proline at the position corresponding to position 258 of the polypeptide of SEQ ID NO: 4, and a lysine at the position corresponding to position 278 of the polypeptide of SEQ ID NO: 4.

* * * * *